US008369365B2

(12) United States Patent
Inada (10) Patent No.: US 8,369,365 B2
(45) Date of Patent: Feb. 5, 2013

(54) NETWORK TERMINAL AND COMPUTER READABLE MEDIUM

(75) Inventor: Hajime Inada, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 189 days.

(21) Appl. No.: 12/163,260

(22) Filed: Jun. 27, 2008

(65) Prior Publication Data

US 2009/0003562 A1 Jan. 1, 2009

(30) Foreign Application Priority Data

Jun. 29, 2007 (JP) ................................ P2007-173508

(51) Int. Cl.
*H04J 3/02* (2006.01)
(52) U.S. Cl. ........ 370/540; 370/537; 370/538; 370/539; 710/266
(58) Field of Classification Search .................. 370/537, 370/538, 539, 540; 710/266
See application file for complete search history.

(56) References Cited

U.S. PATENT DOCUMENTS

| 4,959,648 | A | * | 9/1990 | Breeden et al. ................ 340/7.3 |
| 6,631,186 | B1 | * | 10/2003 | Adams et al. ............ 379/201.12 |
| 7,023,975 | B2 | * | 4/2006 | Mansfield et al. ....... 379/167.01 |
| 7,075,918 | B1 | * | 7/2006 | Kung et al. .................... 370/352 |
| 7,155,000 | B2 | * | 12/2006 | Heijnen et al. ................ 379/161 |
| 7,155,001 | B2 | * | 12/2006 | Tiliks et al. .................... 379/196 |
| 7,266,129 | B1 | * | 9/2007 | Ohsawa et al. ............... 370/437 |
| 7,272,382 | B2 | * | 9/2007 | Servi et al. .................... 455/411 |
| 7,599,477 | B2 | * | 10/2009 | Le Pabic .................... 379/93.01 |
| 7,752,436 | B2 | * | 7/2010 | Grobman et al. ............. 713/164 |
| 7,778,159 | B2 | * | 8/2010 | Driscoll et al. ............... 370/217 |
| 7,971,057 | B2 | * | 6/2011 | Grobman et al. ............. 713/164 |
| 2003/0035530 | A1 | * | 2/2003 | Mansfield et al. ............ 379/219 |
| 2005/0021876 | A1 | | 1/2005 | Asai et al. |
| 2005/0125789 | A1 | | 6/2005 | Dijkstra et al. |
| 2006/0135198 | A1 | | 6/2006 | Lee |

(Continued)

FOREIGN PATENT DOCUMENTS

| JP | 2001-306339 A | 11/2001 |
| JP | 2004-348439 A | 12/2004 |

(Continued)

OTHER PUBLICATIONS

Japan Patent Office; Office Action in Japanese Patent Application No. 2007-173508 (counterpart to the above-captioned U.S. patent application) mailed Jun. 16, 2009.

*Primary Examiner* — Hassan Phillips
*Assistant Examiner* — Mark A Mais
(74) *Attorney, Agent, or Firm* — Baker Botts L.L.P.

(57) ABSTRACT

A network terminal includes an operating system on which a plurality of user environments can run in parallel, a plurality of calling units corresponding to the plurality of user environments respectively, and a plurality of cooperative units corresponding to the plurality of user environments respectively. Priorities different from one another is assigned to the plurality of user environments respectively. Each calling unit is configured to convert a first telephone signal received from an interface and a second telephone signal received from an IP telephone terminal so that an IP telephone communication is performed between the interface device and the IP telephone terminal. Each cooperative unit is configured to communicate the interface with the corresponding calling unit in response to a calling request received from the IP telephone terminal. A cooperative unit corresponding to a user environment to which the highest priority among the plurality of user environments is assigned communicates the interface with the corresponding calling unit.

16 Claims, 7 Drawing Sheets

U.S. PATENT DOCUMENTS

2007/0156659 A1 * 7/2007 Lim ................................. 707/3
2007/0234372 A1 * 10/2007 Wan ............................. 719/322

FOREIGN PATENT DOCUMENTS

| JP | 2005-175722 | 6/2005 |
| JP | 2005-516281 T | 6/2005 |
| JP | 2006-146910 A | 6/2006 |
| JP | 2006-325172 | 11/2006 |
| JP | 2007-028112 | 2/2007 |
| JP | 2007-028448 | 2/2007 |
| JP | 2007-053711 | 3/2007 |

* cited by examiner

NETWORK TERMINAL AND COMPUTER READABLE MEDIUM

CROSS REFERENCE TO RELATED APPLICATION

This application claims priority from Japanese Patent Application No. 2007-173508 filed Jun. 29, 2007. The entire content of each of these priority applications is incorporated herein by reference.

TECHNICAL FIELD

The present invention relates to a computer readable medium and a network terminal that control communication between a calling application running on a multi-user operating system of a network terminal and an interface device connected to a network terminal.

BACKGROUND

When a user wants to utilize an IP telephone system, he or she installs a calling application, which is a software program for performing outgoing calls, incoming calls and audio communication, provided by a provider of IP telephone system in a personal computer or telephone terminal. Information such as user ID, display name, and profile for indicating the identity of a user are registered in the calling application. Skype can be taken as an example of the IP telephone system.

In recent years, a multi-user environment where a plurality of different user environments can be operated in parallel is used in an operating system of a personal computer. On each user environment, a software program such as a communication application is allowed to continue running in an independent manner. Windows XP® by Microsoft can be taken as an example of such a multi-user operating system. That is, in a state where a first user has logged on to Windows XP®, a second user can log on to Windows XP® without the need for the first user to log out from Windows XP®. The first and second users can continue running the software program on the respective user environments.

Japanese Patent Application Publication No. 2005-175722 discloses a system where a personal computer capable of communicating across a network is connected to a handset via a USB connection. In this system, a user using the handset performs IP telephone communication with a partner device on a network using a calling application installed in the personal computer.

SUMMARY

The information such as user ID for identifying a user is registered in the calling application, so that when a user makes a calling operation, he or she needs to use a calling application in which his or her own user ID has been registered. However, Japanese Patent Application Publication No. 2005-175722 does not describe the multi-user environment. Therefore, if the technique disclosed in Japanese Patent Application Publication No. 2005-175722 is applied to the multi-user environment, individual calling applications will run on respective user environments which operate in parallel on the personal computer.

While the individual calling applications run on respective user environments, only one device driver runs on the operating system for each device type. The device driver is used for connecting the handset and personal computer (examples of the device driver include an HID driver for controlling an HID (Human Interface Device) and audio driver for controlling an audio device) to control the operation of I/O devices. Under such a circumstance, when a command for requesting the calling application to transmit a list of candidates of a calling partner is transmitted from the handset, the HID driver, which plays a role of transmitting the command to the calling application, cannot know to which calling application the command should be transmitted. Therefore, there occurs a case where the command is transmitted to all calling applications or command is transmitted to a least expected calling application. If the command is transmitted to all calling applications, the lists are transmitted from a plurality of calling applications and, accordingly, the user cannot know which list is transmitted from which calling application. Further, if the command is transmitted to a least expected calling application, there may occur a case where a least expected list is transmitted, which makes user's selection operation difficult.

When the user selects a calling partner from the list, a command for requesting the calling application to establish a calling connection with the selected calling partner is transmitted from the handset. If the command is transmitted, by chance, to a calling application in which user ID of the relevant user has been registered or calling application that the relevant user has expected, the user can make a calling operation by using his or her own user ID or user ID that he or she has expected. However, the command is not necessarily transmitted to the calling application in which the user ID of the relevant user has been registered or calling user ID that he or she has expected. That is, there may occur a case where the user makes a calling operation by using a least expected user ID. As typified by the command for requesting the list of candidates of a calling partner, there is a strong possibility of interference in communication of various kinds of commands between the calling application and handset.

When a calling connection with a first external IP telephone terminal is established via a first calling application, audio data from the first external IP telephone terminal is input to the audio driver via the first calling application, and the audio driver reproduces audio from the audio data and transmits the reproduced audio to the handset, whereby audio from the first external IP telephone terminal is reproduced in the handset. Here, assume that a calling request is made from a second IP telephone terminal to a second calling application. In this case, the second calling application inputs audio data corresponding to phone ring to the audio driver. Then, the audio driver reproduces audio from both the audio data of conversation between the first calling application and first external IP telephone terminal and audio data corresponding to the phone ring. As a result, the audio in which the audio data of conversation and audio data corresponding to the phone ring interfere with each other is output to the handset. Further, if the second calling application starts conversation in this state, audio of a plurality of conversations is output to the handset in an interference manner.

This causes a problem that a user uses a calling application in which user ID of the other user has been registered to use the IP telephone, or that interference occurs in communication between the handset and plurality of calling applications.

In view of the above-described drawbacks, it is an objective of the present invention to provide a computer readable medium and a network terminal that control communication between a calling application running on a multi-user operating system of a network terminal and an interface device connected to a network terminal so as to prevent communication interference.

In order to attain the above and other objects, the present invention provides a network terminal including an operating system on which a plurality of user environments can run in parallel, a plurality of calling units corresponding to the plurality of user environments respectively, and a plurality of cooperative units corresponding to the plurality of user environments respectively. Priorities different from one another is assigned to the plurality of user environments respectively. Each calling unit is configured to convert a first telephone signal received from an interface and a second telephone signal received from an IP telephone terminal so that an IP telephone communication is performed between the interface device and the IP telephone terminal. Each cooperative unit is configured to communicate the interface with the corresponding calling unit in response to a calling request received from the IP telephone terminal. A cooperative unit corresponding to a user environment to which the highest priority among the plurality of user environments is assigned communicates the interface with the corresponding calling unit.

Another aspect of the present invention provides a network terminal including an operating system on which a plurality of user environments can run in parallel, a plurality of calling units corresponding to the plurality of user environments respectively, and a plurality of cooperative units corresponding to the plurality of user environments respectively. One of the user environments is specified as a specific user environment. Each calling unit is configured to convert a first telephone signal received from an interface and a second telephone signal received from an IP telephone terminal so that an IP telephone communication is performed between the interface device and the IP telephone terminal. Each cooperative unit is configured to communicate the interface with the corresponding calling unit in response to a calling request received from the IP telephone terminal. A cooperative unit corresponding to the specific user environment communicates the interface with the corresponding calling unit.

Another aspect of the present invention provides a network terminal including an operating system on which a plurality of user environments can run in parallel, a plurality of calling units corresponding to the plurality of user environments respectively, and a plurality of cooperative units corresponding to the plurality of user environments respectively. Each calling unit is configured to convert a first telephone signal received from an interface and a second telephone signal received from an IP telephone terminal so that an IP telephone communication is performed between the interface device and the IP telephone terminal. Each cooperative unit is configured to communicate the interface with the corresponding calling unit in response to a calling request received from the IP telephone terminal. If one cooperative unit has received the calling request while another cooperative unit is communicating the interface with the corresponding cooperative unit, the one cooperative unit fails to communicate the interface with the corresponding calling unit.

Another aspect of the present invention provides a network terminal including an operating system on which a plurality of user environments can run in parallel, a plurality of calling units corresponding to the plurality of user environments respectively, and a plurality of cooperative units corresponding to the plurality of user environments respectively. Each calling unit is configured to convert a first telephone signal received from an interface and a second telephone signal received from an IP telephone terminal so that an IP telephone communication is performed between the interface device and the IP telephone terminal. Each cooperative unit is configured to communicate the interface with the corresponding calling unit in response to a calling request received from the IP telephone terminal. If one cooperative unit has received the calling request while another cooperative unit is communicating the interface with the corresponding cooperative unit, the another cooperative unit stops communicating the interface with the corresponding calling unit.

Another aspect of the present invention provides a computer readable medium provided in a network terminal including an operating system on which a plurality of user environments can run in parallel, priorities different from one another being assigned to the plurality of user environments respectively; a plurality of calling units corresponding to the plurality of user environments respectively, each calling unit being configured to convert a first telephone signal received from an interface and a second telephone signal received from an IP telephone terminal so that an IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal. The computer readable medium includes: acquiring information indicating the priorities; and controlling, based on the information, a cooperative unit corresponding to a user environment to which the highest priority among the plurality of user environments is assigned to communicate the interface with the corresponding calling unit in response to the calling request.

Another aspect of the present invention provides a computer readable medium provided in a network terminal including an operating system on which a plurality of user environments can run in parallel, one of the user environments being specified as a specific user environment; a plurality of calling units corresponding to the plurality of user environments respectively, each calling unit being configured to convert a first telephone signal received from an interface and a second telephone signal received from an IP telephone terminal so that an IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal. The computer readable medium includes: acquiring information indicating the specific user environment; and controlling, based on the information, a cooperative unit corresponding to the specific user environment to communicate the interface with the corresponding calling unit in response to the calling request.

Another aspect of the present invention provides a computer readable medium provided in a network terminal including an operating system on which a plurality of user environments can run in parallel; a plurality of calling units corresponding to the plurality of user environments respectively, each calling unit being configured to convert a first telephone signal received from an interface and a second telephone signal received from an IP telephone terminal so that an IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal. The computer readable medium includes: detecting, in response to the calling request, whether or not one cooperation cooperative unit that is communicating the interface with the corresponding calling unit exists; and controlling another cooperative unit to fail to communicate the interface with the corresponding calling unit even if the another cooperative unit has received the calling request, if the one cooperation cooperative unit that is communicating the interface with the corresponding calling unit exists.

Another aspect of the present invention provides a computer readable medium provided in a network terminal including an operating system on which a plurality of user environments can run in parallel; a plurality of calling units corresponding to the plurality of user environments respectively, each calling unit being configured to convert a first telephone signal received from an interface and a second telephone signal received from an IP telephone terminal so that an IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal. The computer readable medium includes: detecting, in response to the calling request, whether or not one cooperation cooperative unit that is communicating the interface with the corresponding calling unit exists; and controlling the one cooperative unit stops communicating the interface with the corresponding calling unit if the one cooperative unit that is communicating the interface with the corresponding cooperative unit exists and another cooperative unit has received the calling request.

BRIEF DESCRIPTION OF THE DRAWINGS

The particular features and advantages of the invention as well as other objects will become apparent from the following description taken in connection with the accompanying drawings, in which.

DETAILED DESCRIPTION

First to fourth embodiments embodying a computer program and a network terminal 1 according to the present invention will be described with reference to the accompanying drawings.

Figure 1:
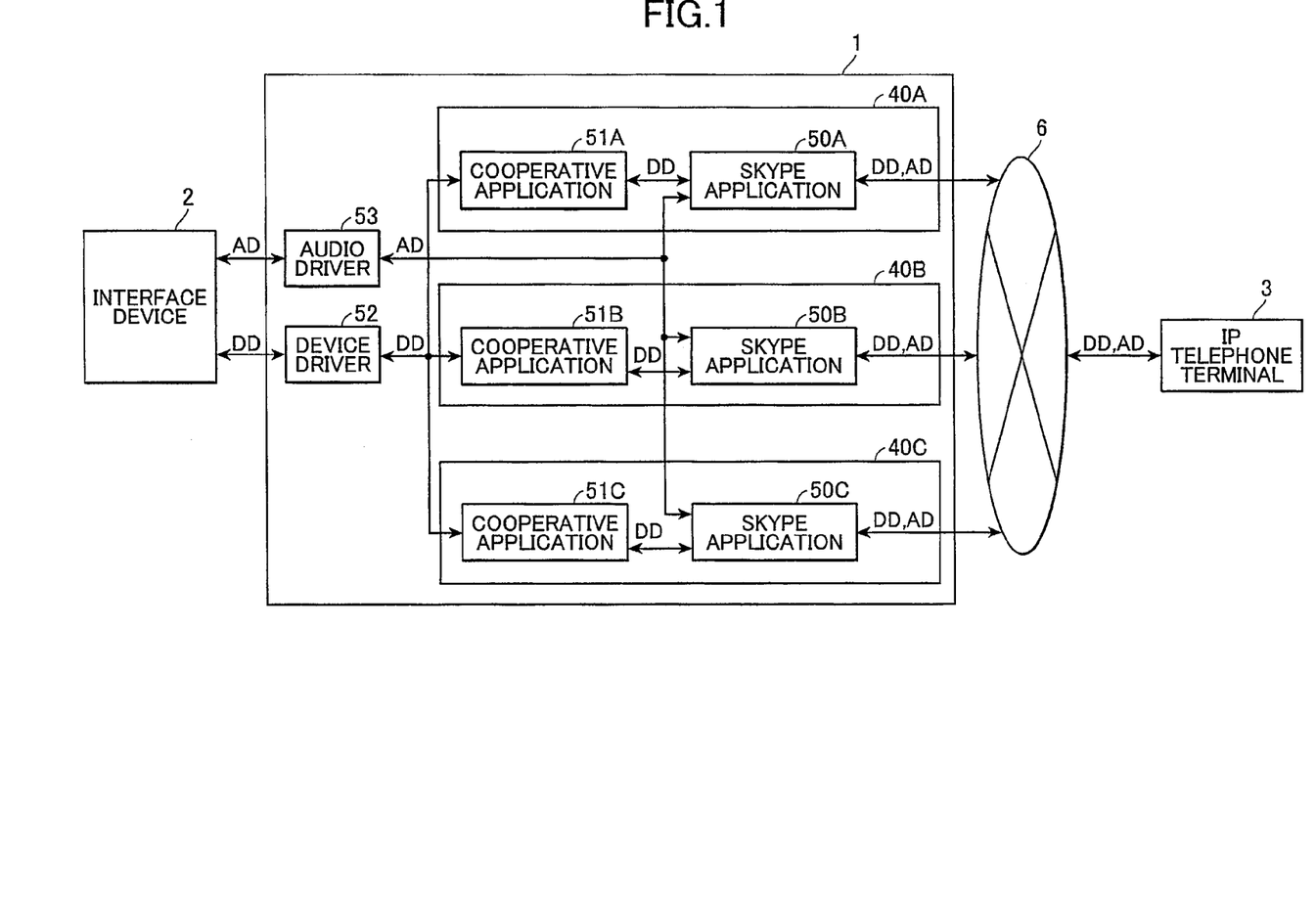
FIG. 1 is a schematic configuration view of an IP telephone system according to the present invention.

The first embodiment will be described using FIGS. 1 to 5. FIG. 1 is a schematic configuration view of an IP telephone system according to the present invention. The IP telephone system shown in FIG. 1 includes a network terminal 1, an interface device 2, and an IP telephone terminal 3. An example of the network terminal 1 includes a personal computer. The interface device 2 has a handset supporting IP telephone call. The network terminal 1 and IP telephone terminal 3 are bidirectionally communicably connected to each other via a network 6. The network terminal 1 and interface device 2 are connected to each other via a USB port.

The number of IP telephone terminals connected to the network 6 is not limited to one, but a plurality of IP telephone terminals may be connected to the network 6. That is, the IP telephone system 1 according to the present invention can perform IP telephone with a plurality of respective IP telephone terminals. The IP telephone terminal is not limited to a terminal device such as a personal computer, but may be a fixed telephone or mobile phone. In this case, a converter (SkypeIn) is connected between the fixed or mobile phone and network terminal so as to ensure compatibility of communication data exchanged between the fixed or mobile phone and network terminal.

A multi-user operating system where a plurality of different user environments are allowed to operate in parallel is installed in the network terminal 1. The functions provided by the operating system are known, so that the description of the functions provided by the operating system is omitted here.

With reference to FIG. 1, communication state between application softwares running in the network terminal 1 will be described. Here, assumed is a case where users A to C log on to the network terminal 1. In this case, user environments 40A to 40C corresponding respectively to the log on users A to C operate in parallel. A skype application 50A and a cooperative application 51A run on the user environment 40A. Similarly, a skype application 50B and a cooperative application 51B run on the user environment 40B, and a skype application 50C and a cooperative application 51C run on the user environment 40C. As described above, the skype application and calling application run on a per user environment basis.

The cooperative applications 51A to 51C are each an application software that allows the skype applications 50A to 50C and a device driver 52 to cooperate with each other to perform interactive communication of data DD. Three cooperative applications 51A to 51C run in parallel on the operating system. The data DD includes various commands for controlling communication between the network terminal 1 and interface device 2 and communication data such as E-mail. The various commands include a command with which the interface device 2 requests the skype applications 50A to 50C to transmit data of a list of candidates of a communication partner to the interface device 2 and a command for transmitting the data of a list of candidates of a communication partner from the skype applications 50A to 50C to interface device 2.

The skype applications 50A to 50C are each an application software for performing interactive communication of data DD and audio data AD with the IP telephone terminal 3 via the network 6. Three skype applications 50A to 50C run in parallel on the operating system.

The device driver 52 is a driver software that allows the cooperative applications 51A to 51C and interface device 2 to cooperate with each other to perform interactive communication of the data DD. Only one device driver 52 runs on the operating system.

An audio driver 53 is driver software that allows the skype applications 50A to 50C and interface device 2 to cooperate with each other to perform communication of the audio data AD. When the audio data AD is input from the skype applications 50A to 50C to the audio driver 53, the audio driver 53 reproduces audio from the audio data and transmits the reproduced audio to the interface device 2. As a result, the audio data AD transmitted from the IP telephone terminal 3 is reproduced in the interface device 2. Only one audio driver 53 runs on the operating system.

Figure 2:
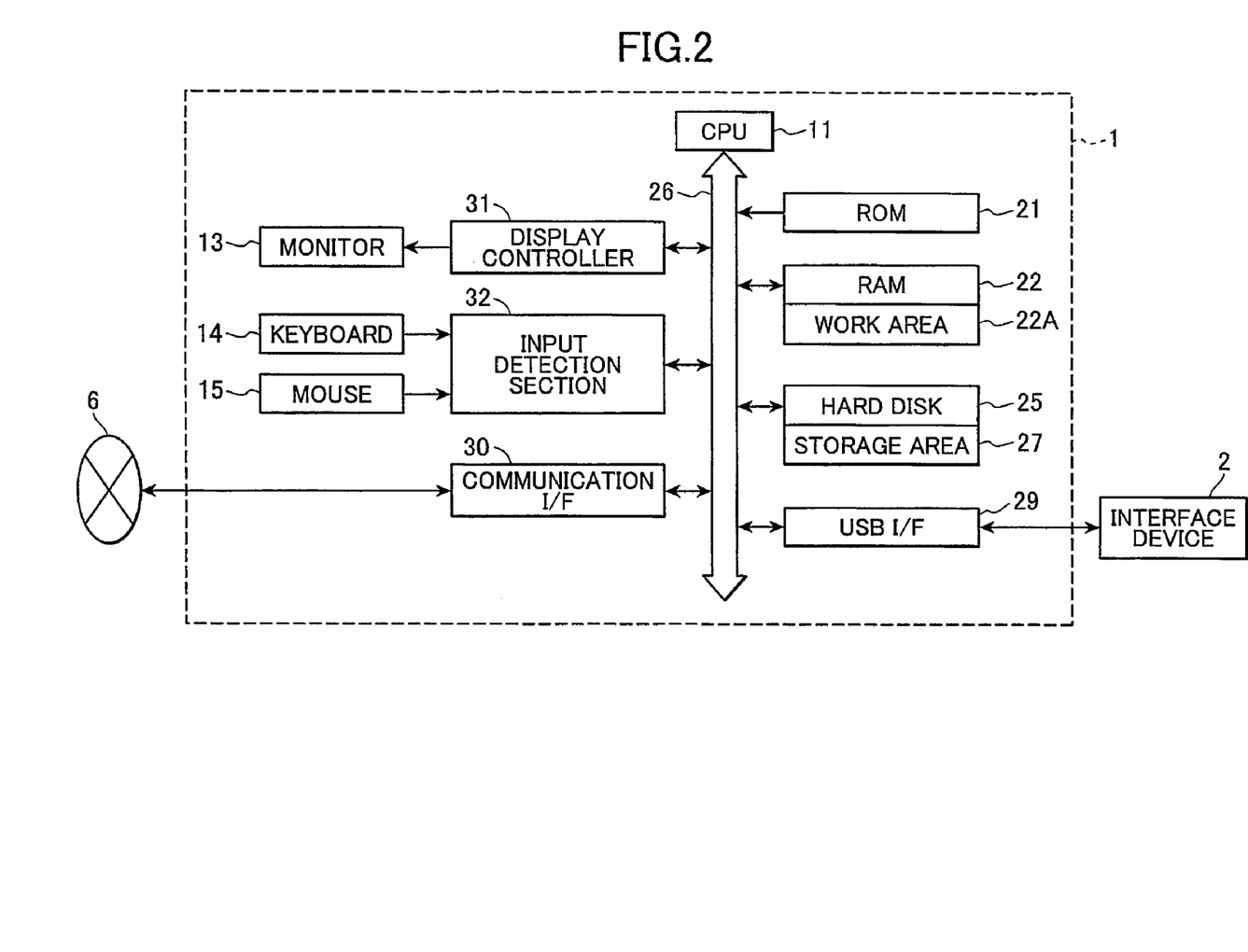
FIG. 2 is a view showing an electrical configuration of a network terminal 1.

With reference to FIG. 2, an electrical configuration of the network terminal 1 will next be described. A CPU 11 for controlling the network terminal 1 is provided in the network terminal 1. A ROM 21, a RAM 22, and a hard disk 25 are connected, via a bus 26, to the CPU 11. The ROM 21 is configured to store a program such as a BIOS that the CPU 11 executes. The RAM 22 is configured to temporarily store various results of calculations made by the CPU 11. The hard disk 25 is configured to store various data. Various storage areas such as a work area 22A are provided in the RAM 22. A storage area 27 for storing the skype applications 50A to 50C and cooperative applications 51A to 51C which are executed in the network terminal 1 is provided in the hard disk 25.

A USB I/F 29, a communication I/F 30, a display controller 31, and an input detection section 32 are connected to the bus 26. The USB I/F 29 is configured to establish a USB connection with the interface device 2. The communication I/F 30 is configured to establish communication with the network 6. The display controller 31 is configured to display a user operation screen on a monitor 13. The input detection section 32 is configured to detect an input from a keyboard 14 or mouse 15 operated by a user. The keyboard 14 or mouse 15 may be connected to the network terminal 1 via any suitable means, such as a radio communication using an infrared ray and a short LAN cable.

Figure 3:
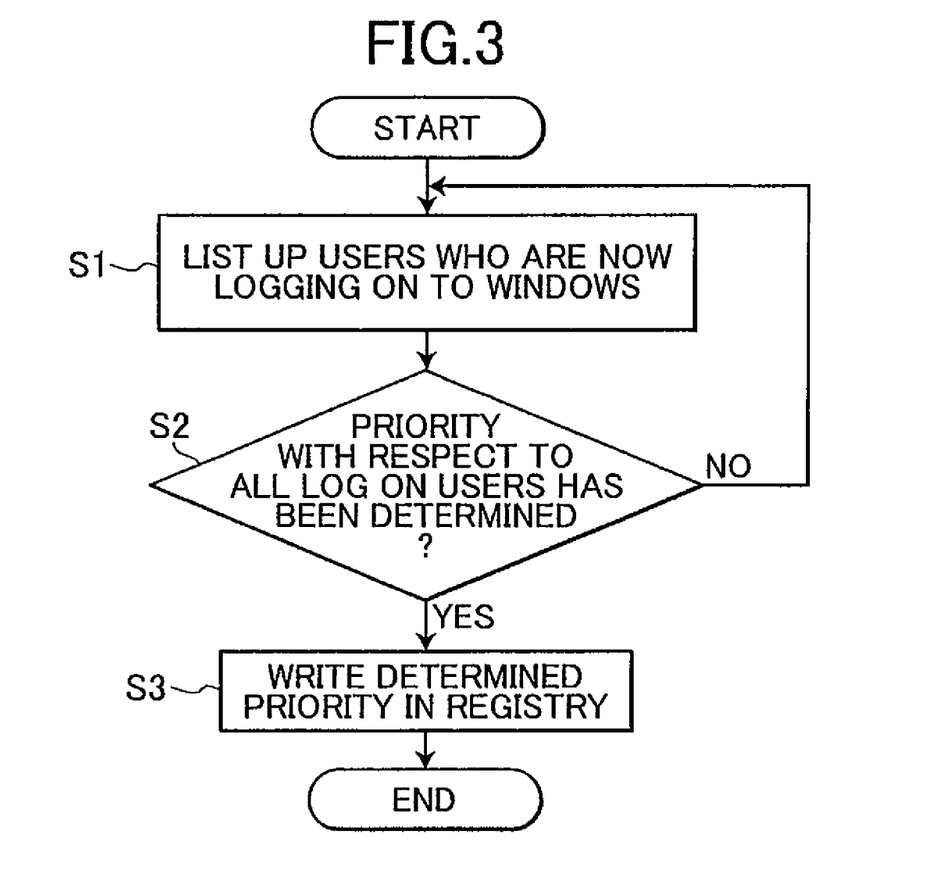
FIG. 3 is a flowchart showing a procedure for determining the priority in a first embodiment.

Processing operations of respective applications executed in the network terminal 1 according to the first embodiment will be described with reference to flowcharts of FIGS. 3 to 5. In the first embodiment, exclusive control of communication between the driver and applications is performed according to a priority.

Assumed is a case where the users A to C have logged on to the network terminal 1. The CPU 11 (FIG. 2) executes the skype applications and cooperative applications stored in the storage area 27. Then, as shown in FIG. 1, the skype applications 50A to 50C and cooperative applications 51A to 51C run in parallel on the user environments 40A to 40C. The processing steps shown in FIGS. 3 to 5 are executed by the CPU 11 (the skype applications 50A to 50C and cooperative applications 51A to 51C) of the network terminal 1.

With reference to the flowchart of FIG. 3, a processing flow for determining the priority among the log-on users will be described. This processing flow may be started simultaneously with the start of the cooperative applications A to C, or started by a user's operation at an arbitrary timing.

In step (hereinafter abbreviated as "S") S1, the CPU 11 acquires users who are now logging on to Windows using an API (Application Program Interface) of Windows to, makes a list of the log-on users, and displays a list of the log-on users A to C on the monitor 13 via the display controller 31. In the present embodiment, the users A to C are listed up. The priority among the users A to C is determined by a user's input operation through the keyboard 14 or mouse 15. In the present embodiment, it is assumed that the first priority is determined to the user A, second priority is to the user B, and third priority is to the user C.

In S2, the CPU 11 determines whether or not the priority with respect to all of the listed-up log-on users has been determined. If the priority with respect to all of the listed-up log-on users has not been determined (NO in S2), the CPU 11 returns to S1, and waits until the priority with respect to the remaining log-on users has been determined.

If the priority with respect to all of the listed-up log-on users has been determined (YES in S2), in S3, the CPU 11 writes the determined priority among the log-on users in a registry of the hard disk 25, whereby the flow for determining the priority among the users is ended.

Next, with reference to the flowchart of FIG. 4, a first exclusive control of operation of the cooperative applications 51A to 51C will be described. In the first exclusive control of operation operation, one of the cooperative applications 51A to 51C is handled to the device driver 52 in accordance with the priority among the log-on users determined by the user. The first exclusive control of operation can be operated in parallel with processing of a second exclusive control of operation described later, after the priority among the log-on users has been determined.

In S11, each of the cooperative applications 51A to 51C acquires the priority given to each user from the registry of the hard disk 25. In the present embodiment, the cooperative applications 51A to 51C recognize that the priority given to the corresponding users A to C are first priority, second priority, and third priority.

In S12, each of the cooperative applications 51A to 51C acquires the Windows user name of a corresponding user environment, using the API of Windows, in order to know the user environment where each of the cooperative applications 51A to 51C itself runs. In the present embodiment, the cooperative applications 51A to 51C recognize that the corresponding user environments are user environments 40A to 40C.

In S13, each of the cooperative applications 51A to 51C acquires Windows user name who is now logging on to Windows, using the API of Windows. In the present embodiment, the cooperative applications 51A to 51C recognize that the corresponding log on user names are users A to C.

In S14, each of the cooperative applications 51A to 51C determines whether the priority given to the user of the operating environment where each of the cooperative applications 51A to 51C itself runs is the highest among the log-on Windows users. In the present embodiment, the priority of the user A is highest (first priority) among the currently log-on users A to C. Thus, the cooperative application 51A determines that the user A of the user environment 40A where the cooperative application 51A itself runs has the highest priority (YES in S14) and proceeds to S15.

If only users B and C have logged on to Windows, the cooperative application 51B determines that the user B whose priority is higher than that of the user C is the highest priority. If only the user C has logged on to Windows, the cooperative application 51C determines that the user C is the highest priority.

In S15, the cooperative application 51A performs handling of the device driver 52. By handling the device driver 52, the cooperative application 51A can acquire commands from the device driver 52 or input commands to the device driver 52. Thus, the device driver 52 and cooperative application 51A are connected in a one-to-one manner, thereby allowing the skype application 50A and interface device 2 to exchange the data DD in a one-to-one manner. This prevents commands from being input to the interface device 2 from the skype applications 50B and 50C to thereby prevent interference between commands. Then, the cooperative application 51A returns to S11. The interface device 2 processes various messages based on the data DD received from the skype application 50A.

On the other hand, each of the cooperative applications 51B and 51C determines that the each of the corresponding user environments 40B and 40C where each of the cooperative applications 51B and 51C itself runs is not the highest priority (NO in S14), and in S16 determines whether or not the cooperative application 51B or cooperative application 51C is handling the device driver 52. If the cooperative application 51B or cooperative application 51C is handling the device driver 52 (YES in S16), in S17 the cooperative application 51B or cooperative application 51C ends the handling (release the handle) of the device driver 52, and returns to S11, since the device driver 52 is connected to the cooperative application 51B or cooperative application 51C, that is, the skype application corresponding to the user to whom the highest priority has not been given is connected to the interface device 2. On the other hand, if the cooperative application 51B and cooperative application 51C do not handling the device driver 52 (NO in S16), the cooperative application 51B and cooperative application 51C return to S11.

Thus, the communication between the device driver 52 and cooperative applications 51B and 51C can be excluded according to the priority. As a result, the cooperative application 51A can be determined uniquely as a cooperative application to cooperate with the device driver 52. This prevents the device driver 52 from transmitting a command to all of the skype applications 50A to 50C or from transmitting a command to a skype application that the user does not expect.

Further, the skype application 50A can be determined uniquely as a skype application that can acquire the data DD for requesting the start of call from the interface device 2 and as a skype application that can input the data DD for transmitting a call start request issued from an external device to the interface device 2. As a result, phone call procedure cannot be started using the skype application 50B or skype application 50C, thereby preventing audio of a plurality of conversations from being output in an interference manner to the IP telephone terminal during a calling operation using the skype application 50A.

Next, with reference to the flowchart of FIG. 5, the second exclusive control of operation of the cooperative applications 51A to 51C will be described. In the second exclusive control of operation, one of the cooperative applications 51A to 51C is handled to the device driver 52 in accordance with a call start request issued from the IP telephone terminal 3 to the cooperative applications 51A to 51C. The second exclusive operation can be operated in parallel with processing of the first handling operation described above. The processing procedure of the flowchart of FIG. 5 may be started with the activation of the cooperative applications 51A to 51C. In the present embodiment, a case where the call start request is issued from the IP telephone terminal 3 to the user B will be described.

In S21, each of the cooperative applications 51A to 51C acquires the Windows user name of a corresponding user environment, using the API of Windows, in order to know the user environment where each of the cooperative applications 51A to 51C itself runs. In the present embodiment, the cooperative applications 51A to 51C recognize that the corresponding user environments are user environments 40A to 40C.

In S22, each of the cooperative applications 51A to 51C determines whether or not to have received a message issued from the IP telephone terminal 3. If each of the cooperative applications 51A to 51C has not received a message issued from the IP telephone terminal 3 (NO in S22), each of the cooperative applications 51A to 51C waits until the next message is issued from the IP telephone terminal 3 (returns to a waiting loop). If each of the cooperative applications 51A to 51C has received a message issued from the IP telephone terminal 3 (YES in S22), in S23 each of the cooperative applications 51A to 51C determines whether or not the message is the call start request. In the present embodiment, the call start request is transmitted to the cooperative application 51B.

If the message is the call start request (YES in S23), in S24 the cooperative applications 51B determines that the communication between the IP telephone terminal 3 and the interface device 2 is available. Specifically, the cooperative application 51B determines that the communication between the IP telephone terminal 3 and the interface device 2 is available, when acquiring from the work area 22A information indicating that the cooperative applications 51A and 51C are in a waiting state and that the skype applications 50A and 50C are not engaged in calling, chatting, or voice. If the communication between the IP telephone terminal 3 and the interface device 2 is not available (NO in S24), the cooperative application 51B returns to S22, and waits until the next message is issued from the IP telephone terminal 3.

If the communication between the IP telephone terminal 3 and the interface device 2 is available (YES in S24), in S25 the cooperative application 51B sets the priority of the user B to the highest priority and writes the updated priority information in the registry of the hard disk 25. That is, the updated priority information written in the registry indicates that the user B has the first priority, user A has the second priority, and user C has the third priority. This prevents the cooperative applications 51A and 51C that do not have the highest priority from communicating with the interface device 2, thereby preventing communication interference.

In S26, the cooperative application 51B determines whether or not the cooperative application 51B has already acquired the handle of the device driver 52. If the cooperative application 51B has not yet acquired the handle of the device driver 52 (NO in S26), in S27 the cooperative application 51B acquires the handle of the device driver 52, and in S28 the cooperative application 51B notifies the interface device 2 via the device driver 52 that the cooperative application 51B has received the call start request from the IP telephone terminal 3. At this time, information stored in the work area 22A is updated with information indicating that the network terminal 1 is calling with the IP telephone terminal 3 via the skype application 50B. Then, the user B who has received the notification from the cooperative application 51B can communicate with the IP telephone terminal 3, using the interface device 2.

If the cooperative application 51B has already acquired the handle of the device driver 52 (YES in S26), the cooperative application 51B proceeds to step S28 directly.

When the user B makes an input operation corresponding to the end of a calling operation on the interface device 2, a command indicating the end of a calling operation is transmitted to the cooperative application 51B. Then, the information stored in the work area 22A is updated, by the cooperative application 51B, with information indicating that the network terminal 1 is not calling with the IP telephone terminal 3 via the skype application 50B.

As described above, in the network terminal 1 according to the first embodiment, the cooperative application running on the user environment corresponding to the user having the highest priority among the users who are logging onto Windows allows the corresponding skype application and interface device 2 to cooperate with each other to enable interactive communication. As a result, on the network terminal 1, the user environment where the skype application and interface device 2 cooperate with each other can be set in a one-to-one manner. This prevents communication interference between the interface device 2 and plurality of skype applications 50A to 50C on the multi-user environment. In addition, since the user environment having the highest priority is selected, the user can use an expected skype application.

Further, in the network terminal 1 according to the first embodiment, each of the cooperative applications 51A to 51C determines whether or not to perform cooperative control depending on the relationship between the corresponding user environment where each of the cooperative applications 51A to 51C runs and priority. As a result, the skype application to cooperate with the interface device 2 can be set in a one-to-one manner in accordance with the priority.

Further, in the network terminal 1 according to the first embodiment, the cooperative application checks whether or not the cooperative control is being performed in another cooperative application according to the call start request from the IP telephone terminal. Then, the cooperative application performs the cooperative control if the cooperative control is not performed on the user environment other than the user environment where the relevant cooperative application itself runs; while the cooperative application does not perform the cooperative control if the cooperative control is performed on another user environment. Thus, even when the plurality of user environments 40A to 40C operate on the operating system, the skype application that has received the call start request from an IP telephone terminal can respond to the call start request from the IP telephone terminal 3 in cooperation with the interface device 2 irrespective of the priority of the user environment where the relevant skype application itself runs. Further, since interference between the interface device 2 and plurality of skype applications 50A to 50C is prevented, an access from the IP telephone terminal 3 can be processed without error.

Further, in the network terminal 1 according to the first embodiment, if the cooperative application performs the cooperative control in accordance with the call start request from another IP telephone terminal 3, the priority of the user environment where the relevant cooperative application itself runs is increased to the highest priority among all the user environments in operation. This prevents communication interfere between the skype application which is cooperating with the interface device 2 in accordance with the call start request and skype application which is operating on another user environment.

Further, in the network terminal 1 according to the first embodiment, information concerning the priority is stored in a storage unit such as the registry of the network terminal 1 and is read out from the storage unit as needed. This configuration allows the same information concerning the priority to be shared between the cooperative applications 51A to 51C running on the corresponding user environments 40A to 40C. Further, when a configuration in which the priority input by a user is written in the storage unit is employed, the user always can use a skype application on a desired user environment.

Further, in the network terminal 1 according to the first embodiment, the priority of the user environment responding to the call start request from the IP telephone terminal 3 is stored as the highest priority in the storage unit. Therefore, the user responding to the call start request can continue to use the same skype application until he or she responds to an call start request from another skype application. This is convenient, in particular, when a user finishes conversation over the phone with someone and, after that, he or she wants to make a call to the same person.

Although exclusive control of communication between the driver and applications in accordance with the priority among the log-on users is described in the first embodiment, a method of achieving the exclusive control of communication is not limited to this. For example, the exclusive control can be achieved by specifying a user from the log-on users.

The configuration in which the exclusive control is performed by specifying a user will be described while modifying a part of the flowcharts of FIGS. 3 and 4. Here, assumed is a case where the user A is specified. After the list of the log-on users A to C is displayed in S1 of FIG. 3, the user A is set as the specified user. In S2, the CPU 11 determines whether or not the specification of the user has been made in place of whether the priority has been determined. In S3, in place of the determined priority, the specified user (user A) is written in the registry of the hard disk 25.

Figure 4:
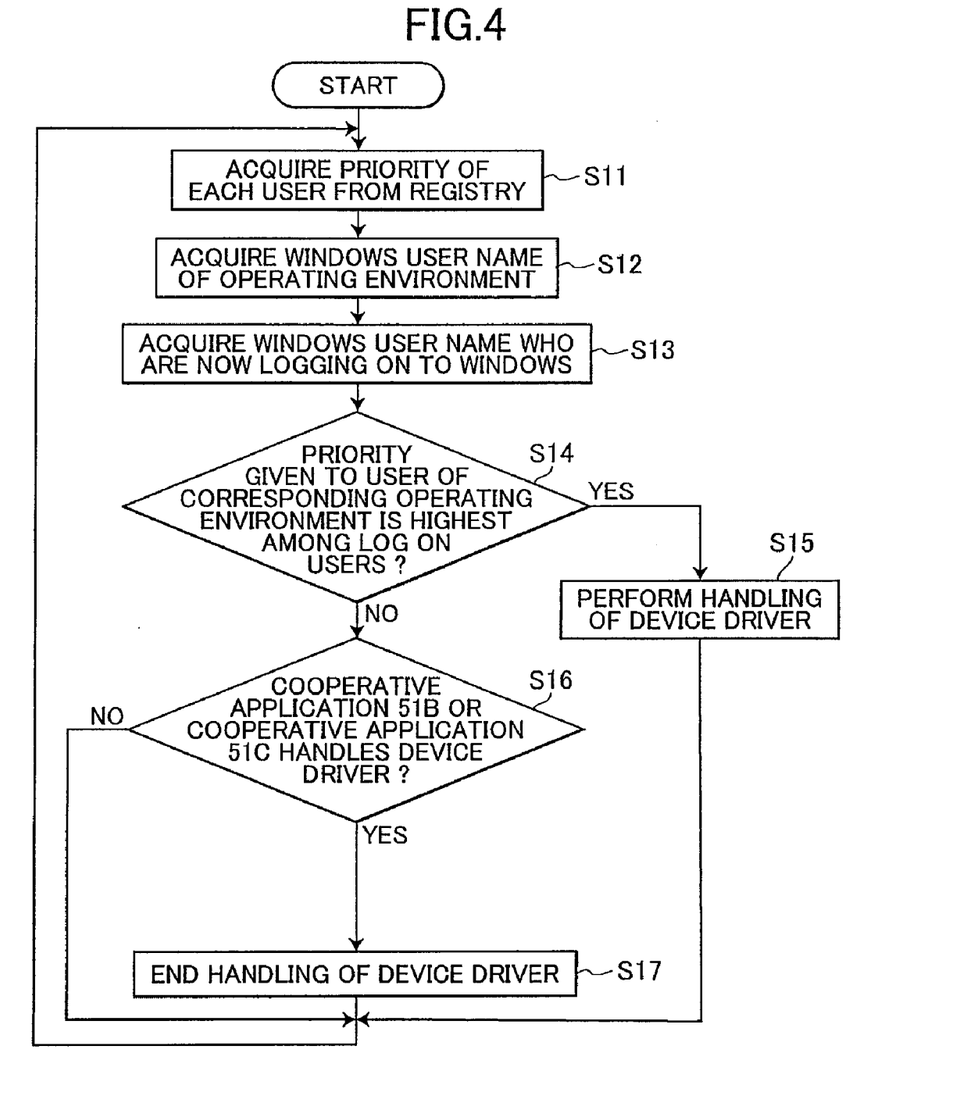
FIG. 4 is a flowchart for explaining a first exclusive control of operation of a cooperative application in the first embodiment.
Figure 5:
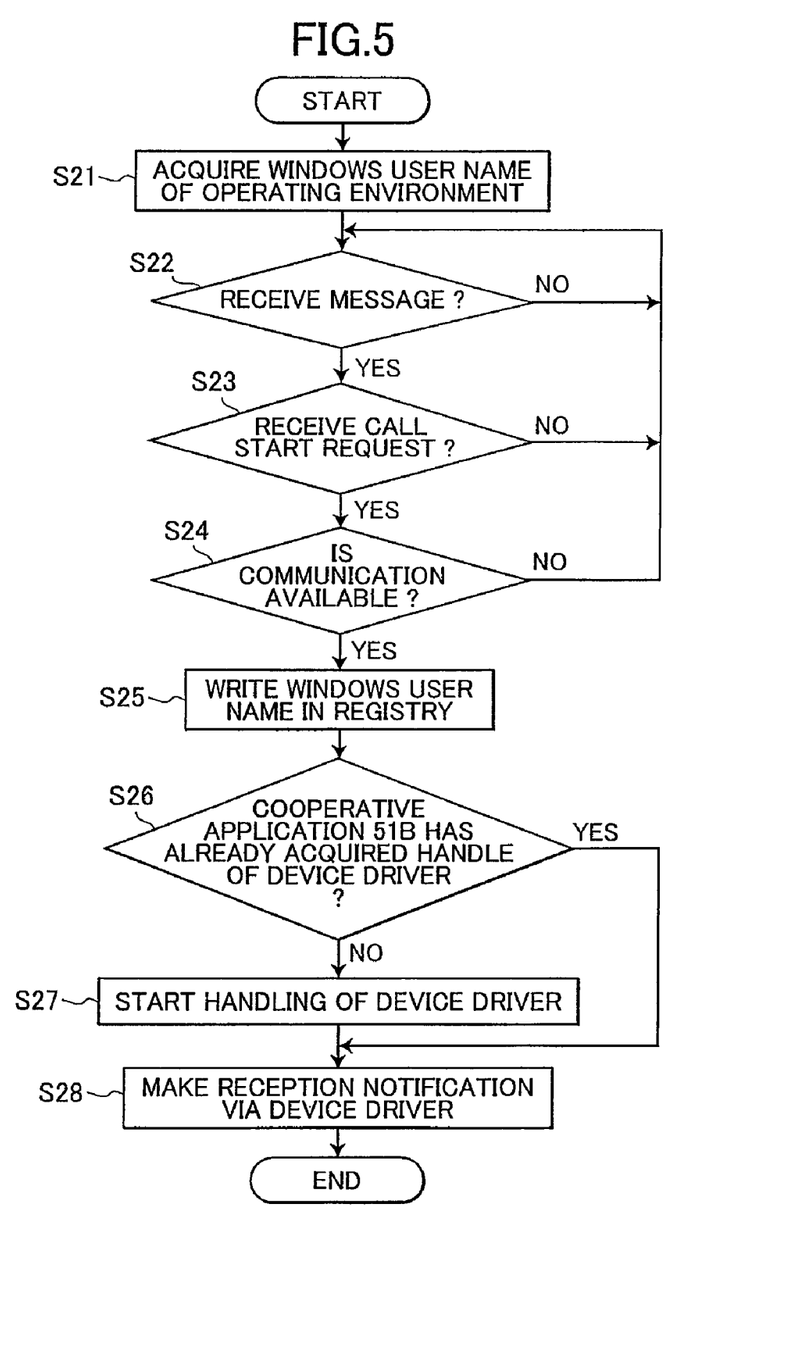
FIG. 5 is a flowchart for explaining a second exclusive control of operation of the cooperative application in the first embodiment.

In S11 of FIG. 4, each of the cooperative applications 51A to 51C acquires the specified user (user A) from the registry of the hard disk 25. In S14, each of the cooperative applications 51A to 51C determines whether the user environment of the specified user coincides with the operating environment where each of the cooperative applications 51A to 51C itself runs. Other steps in the flowchart of FIG. 4 are not modified, so that detailed description is omitted here. Thus, by specifying the user A, the user environment where a calling operation is enabled is fixed to only the user environment corresponding to the user A, thereby preventing communication interference among the users.

Figure 6:
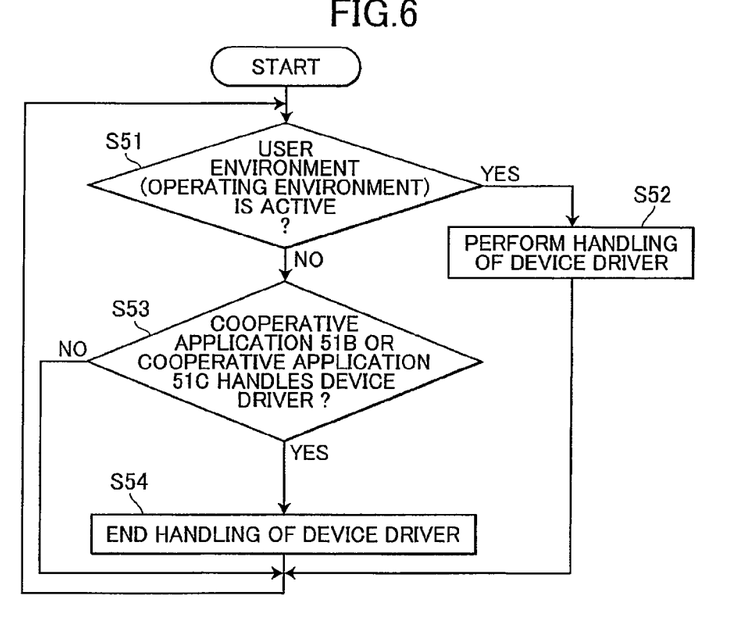
FIG. 6 is a flowchart for explaining a third exclusive control of operation of the cooperative application in a second embodiment.

A second embodiment will be described with reference to FIG. 6. In the second embodiment, a third exclusive control of communication between the driver and applications is performed by specifying a user corresponding to a user environment which is in an active state. The active state is a state where a user can directly operate the skype application in the corresponding user environment via user interface units such as the monitor 13 and keyboard 14 provided in the network terminal 1. The configuration of the network terminal 1 is the same as that of the first embodiment, thus the detailed description is omitted here.

The third exclusive control of operation of the cooperative applications 51A to 51C will be described with reference to the flowchart of FIG. 6. In S51, each of the cooperative applications 51A to 51C determines whether or not the user environment where each of the cooperative applications 51A to 51C itself runs is in the active state. Here, assumed is a case where the user environment 40A is in an active state. Therefore, only the cooperative application 51A determines that the user environment 40A which is the user environment where the cooperative application 51A itself runs is in an active state (YES in S51).

In S52, the cooperative application 51A acquires the handle of the device driver 52. Thus, the interface device 2 can processes various messages based on the data DD received from the skype application 50A. Then, the cooperative application 51A returns to S51.

On the other hand, since the user environments 40B and 40C are not in the active state (NO in S51), in S53 the cooperative application 51B or cooperative application 51C determines whether or not the cooperative application 51B or cooperative application 51C is handling the device driver 52. If the cooperative application 51B or cooperative application 51C is handling the device driver 52 (YES in S53), in S54 the cooperative application 51B or cooperative application 51C ends the handling of the device driver 52, and returns to S51. Thus, the interface 2 is prevented from being connected to the skype application in the user environment which is not in the active state. On the other hand, if the cooperative application 51B and cooperative application 51C is not handling the device driver 52 (NO in S53), the cooperative application 51B and cooperative application 51C returns to S51.

As described above, in the network terminal 1 according to the second embodiment, the handling of the device driver 52 is performed in accordance with the active user environment where a user can directly operate the corresponding skype application. Thus, the user can allow his or her own calling application in which his or her information has been registered via the interface device 2 simply by making the corresponding user environment active, thereby further simplifying operation.

Figure 7:
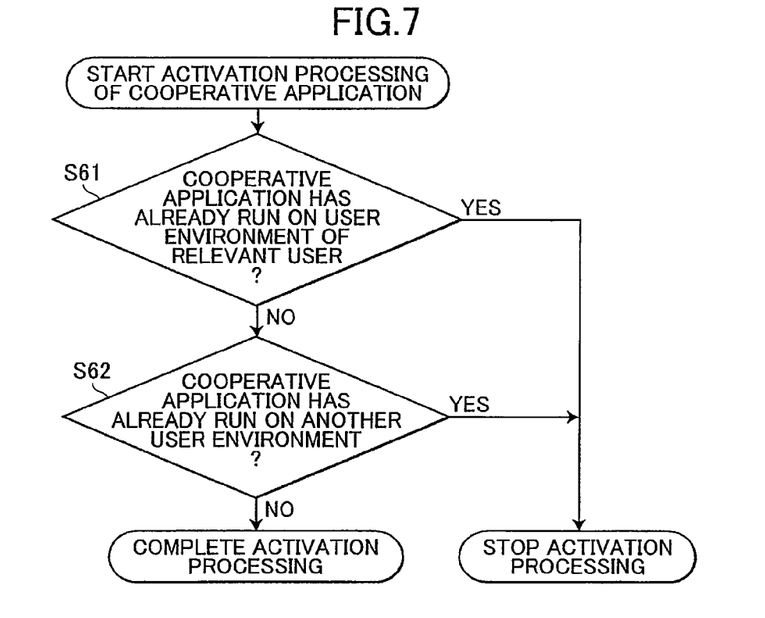
FIG. 7 is a flowchart for explaining a fourth exclusive control of the cooperative application in a third embodiment.

A third embodiment will be described with reference to FIG. 7. In the third embodiment, a fourth exclusive control of operations of the cooperative applications is performed by giving the highest priority to a cooperative application that runs first. The configuration of the network terminal 1 is the same as that of the first embodiment, thus the detailed description is omitted here. In the present embodiment, a case where the users A to C log on to the network terminal 1 and, accordingly, the user environments 40A to 40C operate in parallel will be described. Further, assumed is a case where the user A uses the skype application 50A to start communication.

In response to an instruction from the user A, activation processing of the cooperative application 51A is started. In response to an instruction from the user A, in S61 the cooperative application 51A determines whether or not the cooperative application 51A has already run on the user environment 40A corresponding to the user A. If the cooperative application 51A has already run (YES in S61), the cooperative application 51A stops the activation processing of the cooperative application 51A itself, since the cooperative application 51A has already run.

On the other hand, if the cooperative application 51A does not run (NO in S61), in S62 the cooperative application 51A determines whether or not the cooperative application 51B or cooperative application 51C has already run on the corresponding user environment 40B or user environment 50C. If the cooperative application 51B or cooperative application 51C has already run (YES in S62), the cooperative application 51A stops the activation processing of the cooperative application 51A itself. On the other hand, if the cooperative applications 51B and 51C do not run (NO in S62), the cooperative application 51A completes the activation processing of the cooperative application 51A itself.

As described above, in the network terminal 1 according to the third embodiment, activation of the cooperative application on one target user environment where the cooperative application is to be activated is stopped in the case where there exists another cooperative application that has already run on any other user environment than the one target user environment. With this configuration, in the case where there exists a cooperative application that is running on one user environment, activation of a subsequent new cooperative application on another user environment can be excluded, thereby preventing a plurality of cooperative application from running on the entire network terminal 1. As a result, communication interference between the interface device and plurality of calling applications can be prevented.

Figure 8:
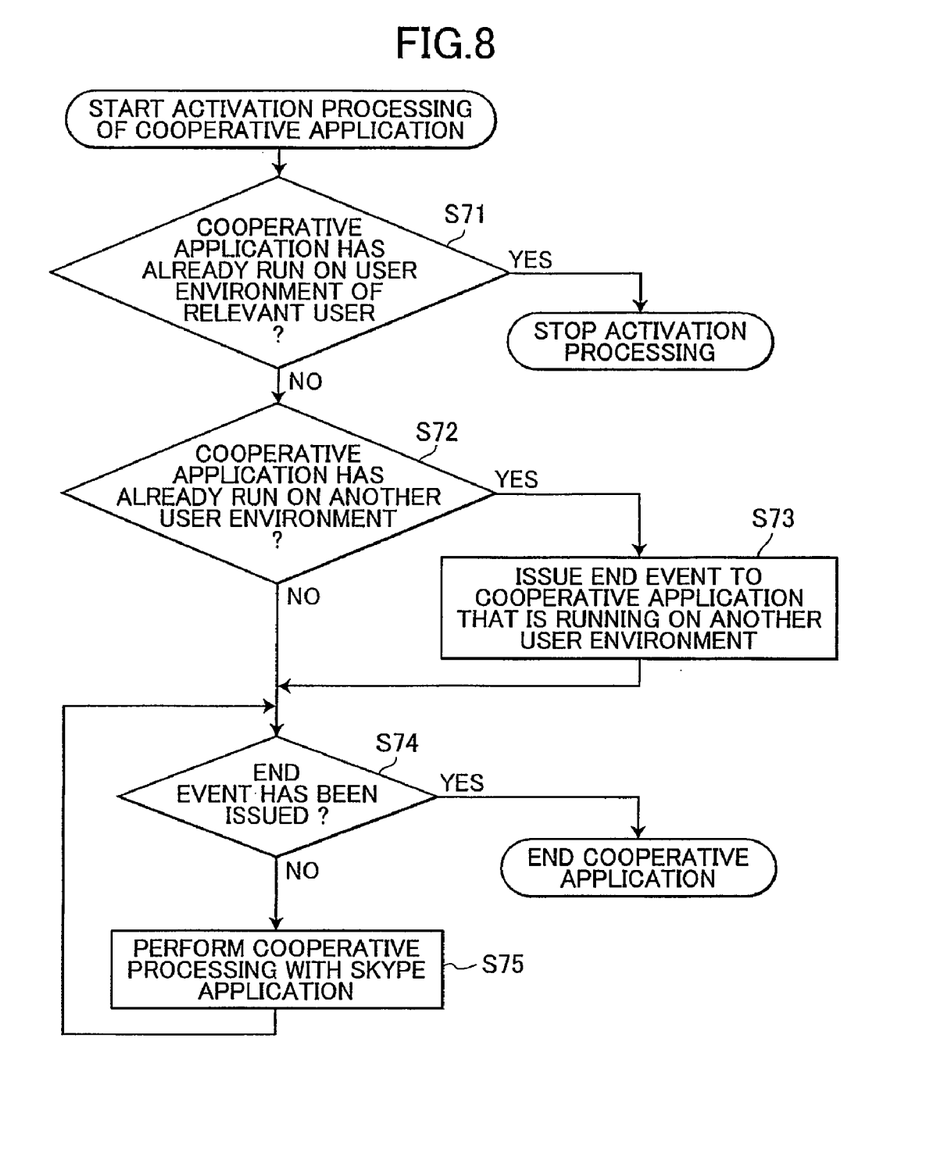
FIG. 8 is a flowchart for explaining a fifth exclusive control of the cooperative application in a fourth embodiment.

A fourth embodiment will be described with reference to FIG. 8. In the fourth embodiment, a fifth exclusive control of operations of the cooperative applications is performed by giving the highest priority to a cooperative application that newly runs. The configuration of the network terminal 1 is the same as that of the first embodiment, thus the detailed description is omitted here. In the present embodiment, a case where the users A to C log on to the network terminal 1 and, accordingly, the user environments 40A to 40C operate in parallel will be described. Further, assumed is a case where the user A uses the skype application 50A to start communication.

In response to an instruction from the user A, activation processing of the cooperative application 51A is started. In response to an instruction from the user A, in S71 the cooperative application 51A determines whether or not the cooperative application 51A has already run on the user environment 40A corresponding to the user A. If the cooperative application 51A has already run (YES in S71), the cooperative application 51A stops the activation processing of the cooperative application 51A itself, since the cooperative application 51A has already run.

On the other hand, if the cooperative application 51A does not run (NO in S71), in S72 the cooperative application 51A determines whether or not the cooperative application 51B or cooperative application 51C has already run on the corresponding user environment 40B or user environment 40C. If the cooperative application 51B or cooperative application 51C has already run (YES in S72), in S73 the cooperative application 51A issues an end event to the cooperative application 51B or cooperative application 51C that is running on the user environment 40B or user environment 40C. The cooperative application 51B or cooperative application 51C that has received the end event ends the operation. On the other hand, the cooperative application 51A completes the activation processing of the cooperative application 51A itself and enters operating state.

Thereafter, in S74 the cooperative application 51A that is running monitors whether or not the cooperative application 51B or cooperative application 51C that is in an activation process has issued an end event. If an end event has been issued (YES in S74), the cooperative application 51A ends the operation of the cooperative application 51A itself in response to the end event. On the other hand, if an end event has not been issued (NO in S74), in S75 cooperative processing between the cooperative application 51A and skype application 50A is continuously performed. Afterward, the processing steps of S74 and S75 are repeated, whereby the cooperative application 51A enters a waiting state for waiting the end event. Thus, in S74 and S75 the cooperative application 51A determines whether or not an end event has been issued to the cooperative application 51A.

As described above, in the network terminal 1 according to the fourth embodiment, if there exists a cooperative application that has already run on any other user environment than the target user environment where the cooperative application is to be activated, operation of the cooperative application on the user environment other than the user environment where the cooperative application is to be activated is ended. With this configuration, in a state where there exists a cooperative application that is running on one user environment, when a new cooperative application is intended to be activated on another user environment, operation of the cooperative application that is running first is stopped. That is, the operation of the cooperative application that is running first can be excluded, thereby preventing a plurality of cooperative applications from running on the entire network terminal 1. As a result, communication interference between the interface device and plurality of calling applications can be prevented.

Although the present invention has been described with respect to specific embodiments, it will be appreciated by one skilled in the art that a variety of changes may be made without departing from the scope of the invention.

For example, a configuration may be employed in which an application program for carrying out the processing flow (FIG. 3) for determining the priority among the log on users separately operates on the operating system. Further, a configuration may be employed in which the user having the highest priority is selected by the interface device and the selected user is stored in the network terminal 1. Further, a configuration may be employed in which the information concerning the priority is stored in the interface device and the cooperative application refers to the priority information stored in the interface device.

In the first and second embodiments, the cooperative application performs handling of the device driver when starting cooperative processing and ends the handling of the device driver when ending the cooperative processing. In place of this, a configuration may be employed in which the cooperative application always handles the device driver. In this case, the cooperative application performs transmission of the data DD when performing the cooperative processing, while the cooperative application does not perform transmission of the data DD when not performing the cooperative processing.

What is claimed is:

1. A network terminal that is configured to accept a plurality of users that log on in parallel with log-on information and to selectively be connected to an interface for IP telephone communications, the network terminal comprising:
   a plurality of applications corresponding to the plurality of users, respectively,
      each application being configured to support IP telephone communications and to run in parallel with the other of the plurality of applications when the plurality of users log on to the network terminal in parallel,
      each application being configured to convert a first telephone signal received from the interface and a second telephone signal received from an external IP telephone terminal when IP telephone communication is performed between the interface and the external IP telephone terminal,
      each application being capable of independently communicating with the external IP telephone when the corresponding user logs on to the network terminal,
      the log-on information with which each user logs on to the network terminal being assigned a corresponding priority, and
      the plurality of applications including a first application corresponding to log-on information to which a first priority is assigned, and a second application corresponding to log-on information to which a second priority is assigned;
   a cooperative unit that is configured to place one of the first application and the second application in communication with the interface according to which of the first application and the second application corresponds to the log-on information that is assigned a higher priority; and
   a controller that is configured to prevent one of the first application and the second application from communicating with the interface according to which of the first application and the second application corresponds to the log-on information that is assigned a lower priority.

2. The network terminal according to claim 1, wherein the network terminal comprises a plurality of cooperative units corresponding to the log-on information with which each user logs on to the network terminal, respectively, each cooperative unit being configured to fail to communicate the interface with a corresponding application when that application does not correspond to the log-on information assigned highest priority.

3. The network terminal according to claim 2,
   wherein each cooperative unit detects, in response to a calling request, whether or not the other cooperation cooperative units communicate the interface with the corresponding applications, respectively,
   wherein each cooperative unit communicates the interface with the corresponding application if all of the other cooperative units do not communicate the interface with the corresponding application, respectively, and
   wherein each cooperative unit fails to communicate the interface with the corresponding application if at least one of the other cooperative units communicates the interface with the corresponding application.

4. The network terminal according to claim 3, further comprising a varying unit configured to vary the priority of the log-on information corresponding to a cooperative unit that has received the calling request to the highest priority.

5. The network terminal according to claim 1, further comprising a storing unit having a configuration that stores the priorities, each cooperative unit reading out the priority of the corresponding user environment from the storing unit.

6. A network terminal comprising:
   an operating system configured to run a plurality of user environments in parallel, each of the user environments corresponding to respective log-on information, the log-on information corresponding to each of the user environments being assigned a corresponding priority;
   a plurality of calling units corresponding to the plurality of user environments, respectively, each calling unit being configured to convert a first telephone signal received from an interface and a second telephone signal received from an IP telephone terminal so that IP telephone communication is performed between the interface device and the IP telephone terminal; and
   a plurality of cooperative units corresponding to the plurality of user environments, respectively, each cooperative unit being configured to communicate the interface with the corresponding calling unit in response to a calling request received from the IP telephone terminal,
   wherein a cooperative unit communicates the interface with the corresponding calling unit when that cooperative unit corresponds to a user environment with log-on information assigned a highest priority.

7. The network terminal according to claim 6, wherein cooperative units other than the cooperative unit corresponding to the user environment that corresponds to the log-on information with highest priority are configured to fail to communicate the interface with the corresponding calling units respectively.

8. The network terminal according to claim 6, further comprising a specifying unit that is configured to operate in a user environment which is in an active state in which a user can directly operate, via a user interface unit provided in the network terminal, the calling unit running on that user environment, such that the log-on information corresponding to that user environment is assigned the highest priority.

9. The network terminal according to claim 6,
   wherein each cooperative unit detects, in response to the calling request, whether or not the other cooperative units communicate the interface with the corresponding calling units, respectively,
   wherein each cooperative unit communicates the interface with the corresponding calling unit if all of the other cooperative units do not communicate the interface with the corresponding calling units, respectively, and
   wherein each cooperative unit fails to communicate the interface with the corresponding calling unit if at least one of the other cooperative units communicates the interface with the corresponding calling unit.

10. The network terminal according to claim 6, further comprising a storing unit having a configuration that stores information indicating the priority assigned to each log-on information, each cooperative unit reading out the information from the storing unit.

11. A network terminal comprising:

an operating system configured to run a plurality of user environments in parallel, each user environment corresponding to respective log-on information, and the log-on information for each of the user environments being assigned a corresponding priority;

a plurality of calling units corresponding to the plurality of user environments, respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal when the log-on information for that cooperative unit is assigned a highest priority, wherein if one cooperative unit has received the calling request while another cooperative unit is communicating the interface with the corresponding cooperative unit, the log-on information for the one cooperative unit is assigned a priority lower than the highest priority so the one cooperative unit fails to communicate the interface with the corresponding calling unit.

12. A network terminal comprising:

an operating system configured to run a plurality of user environments in parallel, each user environment corresponding to respective log-on information, and the log-on information for each of the user environments being assigned a corresponding priority;

a plurality of calling units corresponding to the plurality of user environments, respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal when the log-on information for that cooperative unit is assigned a highest priority, wherein if one cooperative unit has received the calling request while another cooperative unit is communicating the interface with the corresponding cooperative unit, and the log-on information for the another cooperative unit is assigned the highest priority, the another cooperative unit stops communicating the interface with the corresponding calling unit.

13. A non-transitory computer readable medium provided in a network terminal, the network terminal comprising:

an operating system configured to run a plurality of user environments in parallel, each user environment corresponding to respective log-on information, and priorities different from one another being assigned to each log-on information, respectively;

a plurality of calling units corresponding to the plurality of user environments, respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal; and the computer readable medium comprising:

acquiring the priorities assigned to the log-on information; and controlling a cooperative unit corresponding to a user environment with log-on information to which highest priority is assigned to communicate the interface with the corresponding calling unit in response to the calling request.

14. A non-transitory computer readable medium provided in a network terminal, the network terminal comprising:

an operating system configured to run a plurality of user environments in parallel, each user environment corresponding to respective log-on information, and priorities different from one another being assigned to each log-on information, respectively, such that one of the user environments assigned a highest priority;

a plurality of calling units corresponding to the plurality of user environments respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments, respectively, each cooperative unit being configured to communicate the interface with the corresponding calling unit in response to a calling request received from the IP telephone terminal; and the computer readable medium comprising:

determining which user environment is assigned the highest priority; and controlling a cooperative unit corresponding to the user environment that is assigned the highest priority to communicate the interface with the corresponding calling unit in response to the calling request.

15. A non-transitory computer readable medium provided in a network terminal, the network terminal comprising:

an operating system configured to run a plurality of user environments in parallel, each user environment corresponding to respective log-on information, and the log-on information for each of the user environments being assigned a corresponding priority;

a plurality of calling units corresponding to the plurality of user environments respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments, respectively, each cooperative being configured to communicate the interface with the corresponding calling unit in response to a calling request received from the IP telephone terminal and the computer readable medium comprising:

detecting, in response to the calling request, whether or not one cooperation cooperative unit that is communicating the interface with the corresponding calling unit corresponds to a user environment with log-on information assigned a highest priority; and controlling another cooperative unit to fail to communicate the interface with the corresponding calling unit even if the another cooperative unit has received the calling request, if the one cooperation cooperative unit that is communicating the interface with the corresponding calling unit corresponds to a user environment with log-on information assigned the highest priority.

16. A non-transitory computer readable medium provided in a network terminal, the network terminal comprising:

an operating system configured to run a plurality of user environments in parallel;

a plurality of calling units corresponding to the plurality of user environments respectively, each calling unit being configured to convert a first telephone signal received from an interface and a second telephone signal received from an IP telephone terminal so that IP telephone communication is performed between the interface device and the IP telephone terminal; and a plurality of cooperative units corresponding to the plurality of user environments respectively, each cooperative unit being configured to communicate the interface with the corresponding calling unit in response to a calling request received from the IP telephone terminal and the computer readable medium comprising:

detecting, in response to the calling request, whether or not one cooperation cooperative unit that is communicating the interface with the corresponding calling unit corresponds to a user environment with log-on information assigned the highest priority; and controlling the one cooperative unit to stop communicating the interface with the corresponding calling unit if the one cooperative unit that is communicating the interface with the corresponding cooperative unit does not correspond to a user environment with log-on information assigned the highest priority and another cooperative unit that corresponds to a user environment with a higher priority has received the calling request.

\* \* \* \* \*